(12) United States Patent
Signaoff et al.

(10) Patent No.: US 8,813,072 B1
(45) Date of Patent: Aug. 19, 2014

(54) INVERSE VIRTUAL MACHINE

(75) Inventors: Christopher S. Signaoff, Hutto, TX (US); Justin S. Signaoff, Round Rock, TX (US); Tom W. Opsahl, Flower Mound, TX (US); Edward M. Riley, III, Flower Mound, TX (US)

(73) Assignee: DirectPacket Research Inc., Irving, TX (US)

( * ) Notice: Subject to any disclaimer, the term of this patent is extended or adjusted under 35 U.S.C. 154(b) by 468 days.

(21) Appl. No.: 13/051,490

(22) Filed: Mar. 18, 2011

(51) Int. Cl.
*G06F 9/455* (2006.01)

(52) U.S. Cl.
USPC .................................................................. 718/1

(58) Field of Classification Search
CPC .................................................. G06F 9/45533
See application file for complete search history.

(56) References Cited

U.S. PATENT DOCUMENTS

| | | | |
|---|---|---|---|
| 7,027,412 B2 | 4/2006 | Miyamoto et al. | |
| 7,200,734 B2 | 4/2007 | Hyser | |
| 7,213,246 B1 | 5/2007 | van Rietschote et al. | |
| 7,257,811 B2 | 8/2007 | Hunt et al. | |
| 7,296,267 B2 | 11/2007 | Cota-Robles et al. | |
| 7,467,381 B2 | 12/2008 | Madukkarumukumana et al. | |
| 7,480,773 B1 | 1/2009 | Reed | |
| 7,533,385 B1 | 5/2009 | Barnes | |
| 7,577,959 B2 | 8/2009 | Nguyen et al. | |
| 7,596,654 B1 | 9/2009 | Wong | |
| 7,603,670 B1 | 10/2009 | van Rietschote | |
| 7,607,129 B2 | 10/2009 | Rosu et al. | |
| 7,702,743 B1 | 4/2010 | Wong | |
| 7,730,486 B2 | 6/2010 | Herington | |
| 7,756,943 B1 | 7/2010 | Wong | |
| 7,784,053 B2 | 8/2010 | Casey et al. | |
| 8,078,728 B1 * | 12/2011 | Pollan et al. | 709/226 |
| 2005/0160424 A1 | 7/2005 | Broussard et al. | |
| 2008/0244574 A1 | 10/2008 | Shanbhogue et al. | |
| 2009/0300414 A1 | 12/2009 | Huang et al. | |
| 2010/0211946 A1 * | 8/2010 | Elzur | 718/1 |
| 2010/0214419 A1 * | 8/2010 | Kaheel et al. | 348/207.1 |
| 2010/0274380 A1 | 10/2010 | Gray | |
| 2011/0246984 A1 * | 10/2011 | Sharp et al. | 718/1 |
| 2011/0296156 A1 * | 12/2011 | Dandekar et al. | 713/2 |

* cited by examiner

*Primary Examiner* — Mengyao Zhe
(74) *Attorney, Agent, or Firm* — Fulbright & Jaworski LLP

(57) ABSTRACT

A plurality of devices self-assemble their respective resources into a pool for hosting one or more virtual machines (VMs). An inverse virtual machine architecture enables a pool of resources to be assembled for hosting one or more VMs independent of an application-level control program, such as a host OS and/or other application-level program, executing on the host system. In certain embodiments, the plurality of independent physical resources are operable to autonomously join together in forming the pool of resources for VM(s). In certain embodiments, each device comprises VM core logic for self-assembling the devices into the resource pool. The VM core logic may be implemented at a BIOS level of the devices, wherein an operating system is not required to be launched on any of the devices that self-assemble into the resource pool for hosting the VM(s).

25 Claims, 5 Drawing Sheets

INVERSE VIRTUAL MACHINE

CROSS-REFERENCE TO RELATED APPLICATIONS

N/A.

TECHNICAL FIELD

The following description relates generally to virtual machines, and more particularly to systems and methods for a plurality of devices self-assembling their respective resources into a pool for hosting one or more virtual machines.

BACKGROUND

Various implementations and uses of virtual machines (VMs) are known in the art. In general, a virtual machine (VM) is a software implementation of a machine (e.g., a processor-based device, such as a computer) that executes programs like a physical machine. Conventional VMs are typically separated into two major categories based generally on their use and degree of correspondence to any real machine: 1) a system VM (or hardware VM), and 2) a process VM. Conventional system VMs provide a complete system platform which supports the execution of a complete operating system (OS), as well as other software applications that may execute within the VM. In contrast, conventional process VMs are designed to run a single program, which means that it supports a single process.

A characteristic of conventional VMs is that the software running inside a given VM is limited to the resources and abstractions provided by the VM, i.e., the software cannot break out of its virtual world. Conventional system VMs allow the sharing of the underlying physical machine resources between different VMs, each running its own OS. Thus, a physical machine provides resources (e.g., processing resources, memory resources, networking resources, etc.), which are allocated among various VMs that may be created. The software layer that typically provides the virtualization is generally called a virtual machine monitor (VMM) or hypervisor. As discussed further below, conventional hypervisors can run on bare hardware (which are sometimes referred to as Type 1 or native VM) or on top of an OS (which are sometimes referred to as Type 2 or hosted VM).

Various uses for deployment of VMs within a system have been recognized. For instance, many benefits may be achieved through deploying VMs within a system, whereby physical resources of the system are allocated for supporting such VMs. It may be desirable, for example, to employ VMs in certain systems to achieve one or more of the following advantages: a) multiple OS environments can co-exist on the same computer, in strong isolation from each other; b) the VM can provide an instruction set architecture (ISA) that is somewhat different from that of the real machine; and c) application provisioning, maintenance, high availability and disaster recovery may be enhanced through use of VMs.

Multiple VMs may be created on a physical host system. The host system provides the underlying physical resources that are allocated among and used by the VMs. As discussed above, the VMM or hypervisor generally defines/allocates the resources of each VMM, where the underlying physical resources of the host system are used to support the operations of each VM. For instance, as each VM engages or utilizes the "virtual" resources that are visible to it, the underlying physical resources of the host system that are allocated to the VM are engaged or utilized to support/enable the VM's desired function. For instance, the multiple VMs running on a host system may each run their own OS (each called a "guest" OS) and/or other software applications, wherein each VM may use the "virtual" resources that are visible to it to perform operations that are, in turn, supported/enabled by the underlying physical resources of the host system that are allocated to such VM.

For instance, multiple VMs each running their own guest OS are frequently used in server consolidation, where different services that previously ran on individual, separate physical host systems in order to avoid interference are instead run in separate VMs on the same physical host system. The physical host system that provides the underlying resources for VMs is often a single computer, such as a single server, but the host system may be implemented as any aggregation of underlying resources, such as may be provided by a cluster of computers.

The desire to run multiple OSes was the original motivation for conventional VMs, as it allowed time-sharing a single computer between several single-tasking OSes. The guest OSes do not have to be all the same, making it possible to run different OSes on the same host system (e.g., Microsoft Windows and Linux, or older versions of an OS in order to support software that has not yet been ported to the latest version). The use of conventional VMs to support different guest OSes has become popular in embedded systems. One exemplary use is to support a real-time OS at the same time as a high-level OS, such as Linux or Windows. Another use is to sandbox an OS that is not trusted, possibly because it is a system under development. VMs may provide other advantages for OS development and/or other software development, including better debugging access and faster reboots.

Accordingly, the conventional concept of virtualization in information processing systems allows multiple instances of one or more OSes to run on a single host system (which provides the underlying physical resources), even though each OS is designed to have complete, direct control over the system and its resources. Conventionally, virtualization is typically implemented by using a VMM or hypervisor to present to each guest OS a VM having virtual resources, including one or more virtual processors (and other virtual resources, such as networking resources, memory resources, etc.), that the VM's guest OS may completely and directly control, while the VMM maintains a system environment for implementing virtualization policies such as sharing and/or allocating the physical resources of the host system among the VMs (the "virtualization environment"). Each OS, and any other software, that runs on a VM is typically referred to as a "guest," while software, such as a VMM, that runs outside of the VMs (i.e., directly on the host system) and/or the physical resources of the system (as opposed to the virtual resources that are visible to the VM) are typically referred to as a "host."

A host system (which may be referred to as a data processing system) may include various hardware resources, such as one or more central processing units (CPUs), random access memory (RAM), read-only memory (ROM), network access interfaces (e.g., network interface cards), etc. The host system may also include software resources, such as a basic input/output system (BIOS), a virtual machine monitor (VMM), and one or more host OSes.

A VMM is a software program that executes on the host system and controls its physical computer hardware and presents programs executing within a VM with the illusion that they are executing on real physical computer hardware. Each VM typically functions as a self-contained platform, controlled by a "guest" OS, i.e., an OS hosted by the VM, which executes as if it were running on a real machine instead of within a VM. Thus, a conventional VM architecture logically partitions a physical host system, such that the underlying hardware of the host system is time-shared and appears as one or more independently operating VMs.

Conventionally, when a host computer system is started or reset, it loads its BIOS, and then the VMM. A host OS may be started, and then the VMM may be launched on top of the host OS. Alternatively, the VMM may include the control logic necessary for interacting with hardware without an underlying host OS. In this alternative case the VMM is itself an OS kernel, most typically a UNIX/LINUX variant, which starts/boots after POST of the hardware. Thus, the VMM launches its own OS to create VMs. In either case (where a host OS is started and then the VMM is launched or where the VMM itself is an OS kernel), an OS-level program (which is referred to herein as application-level software), i.e., the VMM, is required to be employed after BIOS/POST of the underlying physical host system to create the VMs. The VMM may create and manage one or more VMs, and the VMs may boot to different guest OSes or to different instances of the same guest OS.

Thus, a VMM may effectively allow multiple OSes and software applications to run in independent partitions or execution environments that are defined by the VMs. The CPU(s) and other physical resources in the host system may provide hardware support (e.g., instructions and data structures) for virtualization. Furthermore, different types. of processors may provide different features for supporting virtualization.

Conventionally, the host system (providing the underlying physical resources for VMs) is required to complete its boot process, including completion of its BIOS and POST, and then launch a host OS (or some other application-level program, such as a VMM). Upon a startup of a physical host machine, a boot sequence may be used to boot the host system, which may bring up the host OS and/or VMM to create one or more VMs. As mentioned above, each VM may then run a "guest" OS within it.

As is well-known in the art of computing, booting of a host system generally includes a pre-boot sequence, such as performance of an initial power-on self-test (POST), followed by the system's boot sequence or "bootstrapping" (e.g., via the system's BIOS), which is typically followed by loading of upper-level (control software, such as a host OS. POST generally refers to routines that run immediately after power is applied, by nearly all electronic devices. The routines are part of a device's pre-boot sequence. Once POST completes successfully, bootstrapping code is invoked. Routines included during POST typically include routines to set an initial value for internal and output signals and to execute internal tests, as determined by the device maker. These initial conditions are also referred to as the device's state. They may be stored in firmware or included as hardware, either as part of the design itself, or they may be part of semiconductor substrate either by virtue of being part of a device mask, or after being burned into a device such as a programmable logic array (PLA).

Test results may be enunciated either on a panel that is part of the device, or output via bus to an external device. They may also be stored internally, or may exist only until the next power-down. In general, POST protects the bootstrapped code from being interrupted by faulty hardware. Diagnostic information provided by a device, for example when connected to an engine analyzer, depends on the proper function of the device's internal components. In these cases, if the device is not capable of providing accurate information, subsequent code (such as bootstrapping code) may not be permitted to run. This is done to ensure that, if a device is not safe to run, it is not permitted to run.

Once the POST is passed, the host system's boot sequence or "bootstrapping" code is invoked. Conventionally, bootstrapping or "booting" of a host system generally refers to a technique by which a simple computer program activates a more complicated system of programs. In the start up process of a host system, a relatively small program, such as the system's basic input/output system (BIOS), initializes and tests that the system's hardware resources (e.g., including its peripherals and external memory devices, etc.) are connected.

The host system's BIOS is generally a de facto standard defining a firmware interface (sometimes referred to as the "boot firmware"). The BIOS software is commonly built into the host system's hardware (e.g., ROM), and is the first code run by the host system when powered on (following the above-mentioned POST). Conventionally, the primary function of the BIOS is to load and start a higher-level program (referred to herein as an application-level program), such as an OS. Thus, a host system's BIOS is typically a basic or fundamental low-level software that the system's hardware autonomously knows to invoke upon start-up, typically to load and start a higher-level program such as an OS. As is well-known, when a host system starts up, the first job for the BIOS typically is to initialize and identify system devices such as the video display card, keyboard and mouse, hard disk, CD/DVD drive and other hardware resources of the system. The BIOS then locates software held on a storage resource of the system (often designated as a "boot device"), such as a hard disk or a CD, and loads and executes that software, giving it control of the host system. This process is known as booting, or booting up, which is short for bootstrapping.

Typically, the BIOS software is specifically designed to work with the particular type of system in question, including having a knowledge of the workings of various devices that make up the complementary chipset of the system. In modern computer systems, the BIOS chip's contents can be rewritten allowing BIOS software to be upgraded. The BIOS typically provides a small library of basic input/output functions used to operate and control the peripherals such as the keyboard, text display functions and so forth, and these software library functions are callable by external software. In the IBM PC and AT, certain peripheral cards such as hard-drive controllers and video display adapters carried their own BIOS extension ROM, which provided additional functionality. OSes and executive software, designed to supersede this basic firmware functionality, often provide replacement software interfaces to applications.

Conventionally, VMs are created on a host system after the host system has completed its POST and boot sequence (by its BIOS) and has thus loaded an application-level software program (e.g., the host OS) on the host system. Conventionally, the host OS initializes on the host system, and then some software application executes to create a VM environment, such as the Windows Virtual PC application available from Microsoft or VMware vSphere available from VMware. Alternatively, other application software (e.g., a VMM application that itself is an OS kernel) may be launched after the POST and BIOS completes in addition to or instead of the host OS, and such application-level application program (e.g., VMM application) may be used to create the VM environment.

Multiple VMs can be created on a single host physical machine. With some more advanced OSes, multiple independent systems (each with their own host OS) may be clustered, thereby forming a host system on which multiple VMs may be created/hosted. Conventional VMs also depend on the application-level software program (e.g., host OS or VMM application) that is launched on the host system to instruct the VM as to its available/visible resources. Accordingly, in conventional deployments, the host system must be fully booted (e.g., the POST and BIOS completes and an application-level control program, such as the host OS and/or a VMM application that is itself an OS kernel, is launched by the BIOS) before a VM can be created.

FIG. 1A shows an example of a conventional implementation of VMs deployed on a host system. In this example, a host system 100 provides physical resources, such as CPU(s), memory, network interface, and/or other resources, which are shown generally as a physical resource pool 101. The physical resource pool 101 includes ROM that has stored thereto the system's BIOS code 111, which controls the boot-up process of the system for launching an application-level software program, such as the host OS 102, to which control of the system is passed. The host OS 102 may be Windows, Linux, or other suitable OS, as examples. In certain systems, a VMM which itself is an OS kernel may be launched instead of a host OS 102, but in either case such a VMM or host OS 102 are application-level software that is launched following the completion of the BIOS boot-up sequence for managing the resource pool 101 and/or the creation of VMs.

In the illustrated example of FIG. 1, a VM creation/management application 103, such as the Windows Virtual PC application for example, is launched for creation of VMs on the host system 100. For instance, VMs $VM_1$, $VM_2$, and $VM_3$ are created by the VM creation/management application 103 in this example. As shown, each of the VMs may have a respective guest OS residing therein, such as guest OSes $104_1$-$104_3$. Further, each VM is allocated (e.g., by the VM creation/management application 103) certain virtual resources that are visible to the VM. For instance, $VM_1$ is allocated virtual resources $105_1$, $VM_2$ is allocated virtual resources $105_2$, and $VM_3$ is allocated virtual resources $105_3$. The pool of physical resources 101 of the host system 100 are used to support/enable the operations of the VMs that are performed on their respective virtual resources, in a manner as is well-known within VM architectures.

FIG. 1B shows an operational flow diagram for creation of VMs in a conventional host system, such as that of FIG. 1A. In operational block 120, the host system 100 is powered on. That is, the physical resources 101 of the host system 100 are powered on. In block 121, BIOS 111 controls the boot sequence of the host system 100. In booting the system, the BIOS 111 typically performs various hardware identification, checks, and initialization operations 122, performs POST operations 123, then loads/launches 124 an application-level control program, such as a host OS 102, and then transfers 125 control to the application-level control program (e.g., host OS 102). In block 126, a VM creation/management application 103 is loaded/executed on the host system 100, and in block 127 the VM creation/management application 103 creates VMs (such as $VM_1$-$VM_3$) on the host system 100.

Various conventional VM architectures and implementations are further disclosed in U.S. Patent Application Publication No. 20100325278, U.S. Patent Application Publication No. 20100306774, U.S. Pat. No. 7,865,762, U.S. Pat. No. 7,865,670, and U.S. Pat. No. 7,865,712, as examples.

BRIEF SUMMARY

The present invention is directed generally to virtual machines, and more particularly to systems and methods for a plurality of devices self-assembling their respective resources into a pool for hosting one or more virtual machines. In certain embodiments, a system and method is implemented for deploying what is referred to herein as an "inverse" virtual machine. The inverse virtual machine (or inverse VM) architecture enables a pool of resources to be assembled for hosting one or more VMs independent of an application-level control program, such as a host OS and/or other application-level program, executing on the host system. Thus, in certain embodiments, the inverse virtual machine architecture enables a plurality of independent physical resources (e.g., separate devices or machines) to assemble to form a pool of physical resources available for supporting one or more VM(s). In certain embodiments, the plurality of independent physical resources are operable to autonomously join together in forming the pool of resources for a VM. As discussed further herein, in certain embodiments, each device comprises VM core logic for self-assembling the devices into the resource pool. The VM core logic may be implemented at a BIOS level of the devices, wherein an operating system is not required to be launched on any of the devices that self-assemble into the resource pool for hosting one or more VMs.

Thus, according to certain embodiments, VM core logic is implemented at the BIOS level of the devices that provide the underlying physical resources for supporting VM(s). The VM core logic may, for example, be natively performed by the device as part of its boot-up sequence to cause its respective device to self-assemble with other devices to form the resource pool for hosting the VM(s).

According to certain embodiments, the VM core logic of the devices, whether implemented at the BIOS level of such devices or at another level, function to self-assemble or self-aggregate the resources of their respective physical machines to form a resource pool for hosting the VM(s).

In one embodiment, a method for forming a pool of resources for hosting one or more VMs is provided. The method comprises launching, on a first device having a first set of resources, a VM core logic, and determining by the VM core logic one or more predefined peer member devices. In certain embodiments, identification of such one or more predefined peer member devices may be hard-coded into the VM core logic, or the VM core logic may be configured to access a local or remote database to discover the identity of such one or more predefined peer member devices, as examples. The VM core logic then communicatively couples with the one or more predefined peer member devices and exchanges information with such peer member device(s) that identifies each device's respective resources for self-assembling the resources of the devices into a pool of resources for hosting one or more virtual machines.

In certain embodiments, the VM core logic is launched at a BIOS level of the first device. The VM core logic is implemented in the BIOS (e.g., as part of the BIOS code of the device). Further, each of the peer member devices may likewise have VM core logic implemented thereon (e.g., launched at each device's respective BIOS level), wherein the VM core logic of the various devices interact to self-assemble their device's respective resources to form the resource pool for hosting the VM(s). In certain embodiments, the VM core logic is launched by the BIOS, and the VM core logic may be so launched without the BIOS launching an operating system. For instance, in certain embodiments, an OS is not required to be launched on any of the devices that form the resource pool.

In certain embodiments, the VM core logic communicatively couples with a data link hub, wherein the data link hub identifies the one or more predefined peer member devices and communicatively couples with such peer member device(s) for forming the resource pool. Thus, the communicative coupling between the peer member devices may be direct (e.g., peer to peer) or indirect (e.g., each of the devices may be coupled to an intermediate device or "hub."

In certain embodiments, the method further comprises hosting the one or more VMs on the pool of resources. Such hosting may comprise managing the pool of resources for supporting operations of the VM(s). Each of the VM(s) may comprise at least one guest OS and a respective set of virtual resources that are visible to the guest OS. Further, in certain embodiments, there is no host OS implemented for managing the pool of resources that is hosting the VM(s).

According to another embodiment, a system comprises a first device having a first set of resources, where the first device includes a first BIOS stored to a first non-volatile memory and a first VM core logic implemented at the first BIOS level. The system further comprises a second device having a second set of resources, where the second device includes a second BIOS stored to a second non-volatile memory and a second VM core logic implemented at the second BIOS level. The first VM core logic and second VM core logic are configured to exchange information that identifies the first set of resources and second set of resources for self-assembling the first and second sets of resources into a pool of resources for hosting one or more virtual machines.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
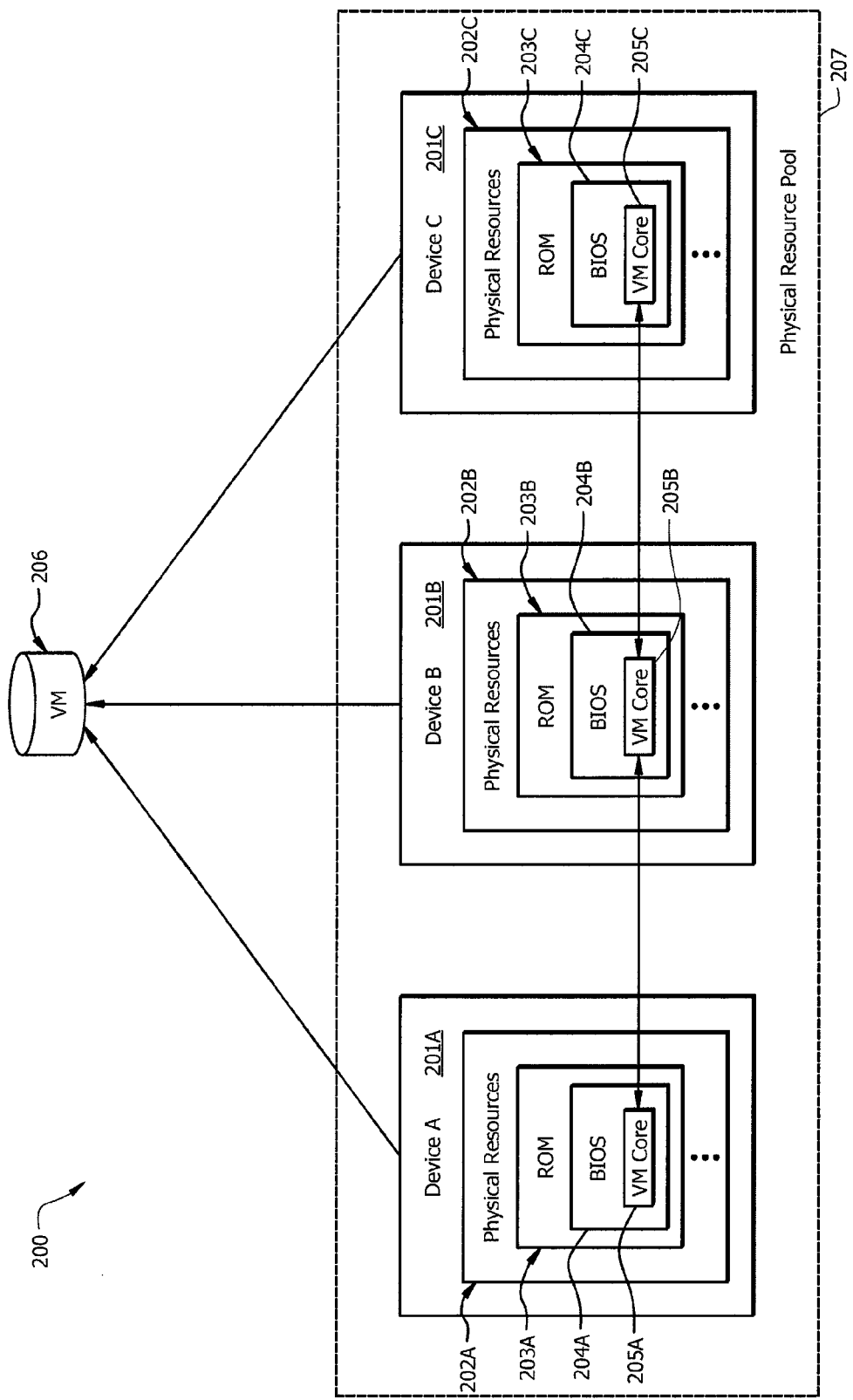
FIG. 2 shows an exemplary system according to an embodiment of the present invention.

FIG. 2 shows an exemplary system 200 according to one embodiment of the present invention. In the exemplary system 200 of FIG. 2, a plurality of devices (or physical machines) 201A-201C are implemented. Each device 201A-201C may be any type of communication device capable of communicating information over a communication network in the manner described herein, non-limiting examples of which include servers, workstations, personal computers, laptop computers, notebook computers, notepad computers, mobile computing devices, personal data assistants (PDAs), mobile telephones, and other processor-based communication devices. Each device 201A-201C, in this example, is a separate device that can be independently powered on/off. While three devices are shown in this example, embodiments of the present invention are not limited to any specific number of devices. For instance, in certain embodiments a plurality of devices (any number of two or more devices) may be so implemented in the manner described herein for devices 201A-201C.

Each device 201A-201C has certain physical resources, such as processing resources (e.g., CPU(s)), memory and/or other data storage resources, network interface resources, and/or other resources, which are shown generally as physical resources 202A-202C. Generally, each device's physical resources includes a ROM that has BIOS stored thereto. For instance, the physical resources 202A of device 201A includes ROM 203A having BIOS 204A stored thereto. Similarly, the physical resources 202B of device 201B includes ROM 203B having BIOS 204B stored thereto, and the physical resources 202C of device 201C includes ROM 203C having. BIOS 204C stored thereto.

Further, in accordance with embodiments of the present invention, each device 201A-201C includes a VM core 205A-205C. As shown, in this exemplary embodiment the VM core is implemented at the BIOS level of each device. For instance, in certain embodiments, the VM core may be included as part of the BIOS software code of a device. In other embodiments the VM core may not be included as part of the BIOS software code, but may instead be invoked by the BIOS software code of the device. In certain embodiments, as each device is powered on, the device's BIOS may be invoked in a conventional manner as discussed above. The device's BIOS may invoke the VM core (which may be implemented as part of the BIOS code), and the VM core generally functions to look for and join an existing physical resource pool that provides the necessary physical resources for supporting operations of a VM 206, as discussed further herein. In this way, in certain embodiments the VM cores 205A-205C provide the functionality to self-assemble or self-aggregate the devices 201A-201C into a physical resource pool 207 that provides underlying physical resources for supporting/enabling operations of a VM 206.

As discussed above, conventionally application-level software (e.g., a VMM) is launched on a host machine, which then creates and manages one or more VMs. However, in certain embodiments of the present invention, the VM cores 205A-205C are implemented at a BIOS level on the underlying resources that, as a result of the function of the VM cores 205A-205C, self-aggregate to form a pool of resources 207 for a VM 206. Indeed, an OS need not even be launched on the underlying devices 201A-201C.

Figure 1A:
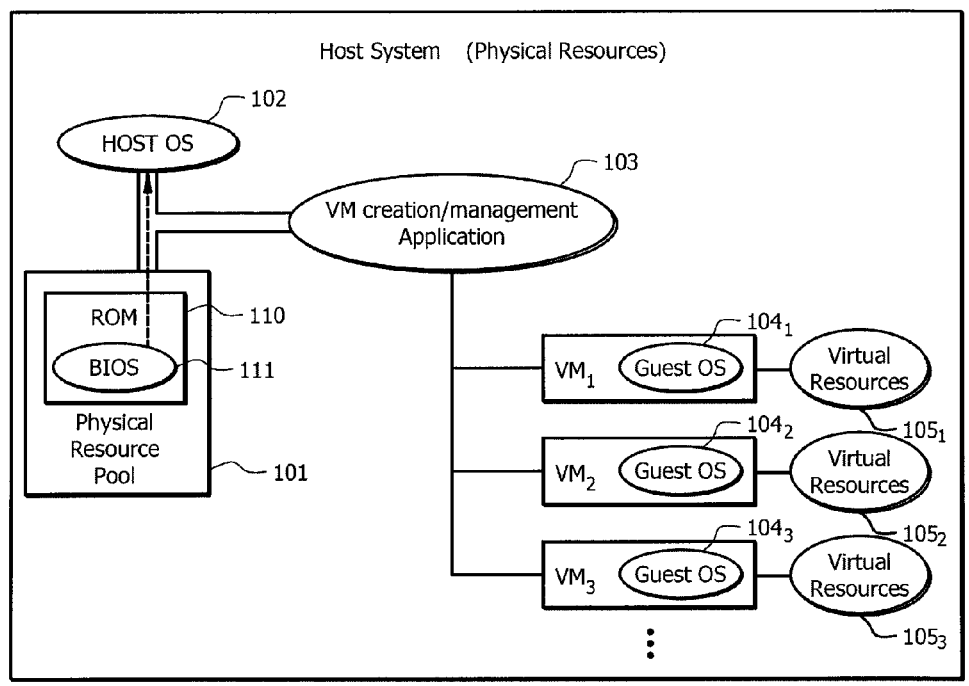
FIG. 1A shows an example of a conventional host system with virtual machines implemented thereon.

The operation of the VM core in accordance with certain embodiments may be referred to herein as being an inverse of the above-described conventional processes for forming a virtual machine. For instance, conventionally the physical resources of a host machine (such as physical resources 101 of host machine 100 of FIG. 1A) are known to (and managed by) a host OS 102, and an application level VMM 103 operates to create the VM(s) (such as VMs $104_1$-$104_3$ of FIG. 1A) and manage the allocation of physical resources 101 for enabling/supporting the operations of the VMs. On the other hand, the exemplary embodiment of FIG. 2 employs a VM core on each of various devices that provide underlying physical resources to self-aggregate (or self-assemble) those resources into a pool 207 for enabling/supporting the operations of one or more VMs, such as VM 206. The various physical resources 202A-202C of devices 201A-201C are not operating under control of a common host OS, and indeed an OS need not even be launched on any of the devices 201A-201C.

Figure 1B:
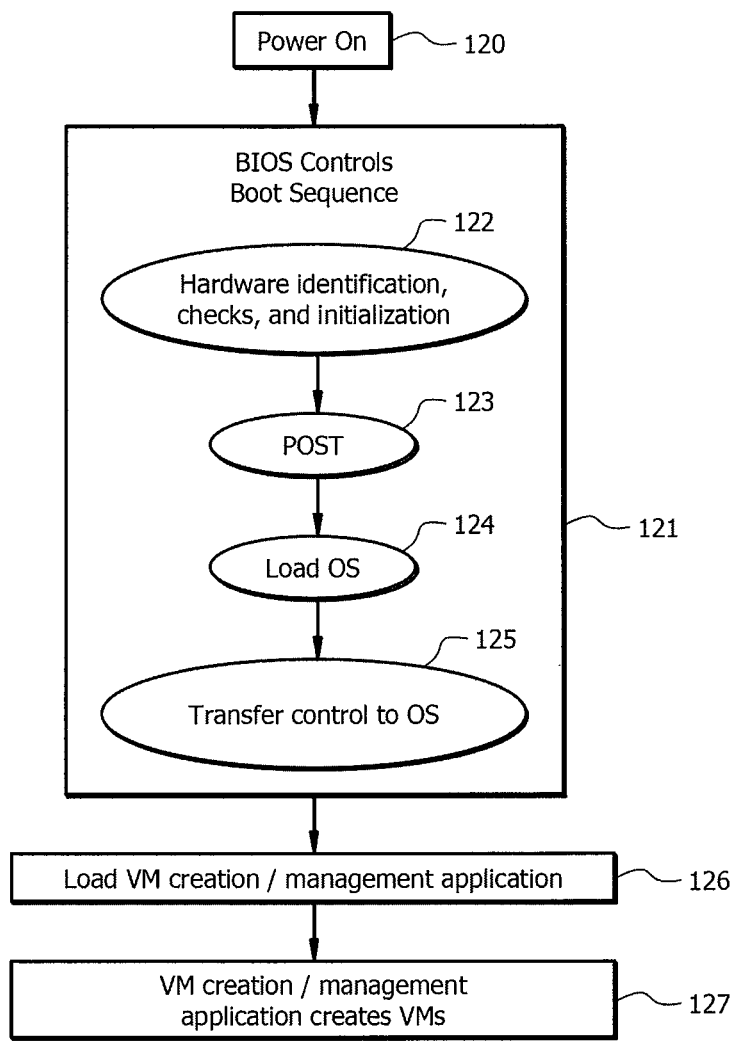
FIG. 1B shows an example of a conventional operational flow for booting the host system and creating the virtual machines thereon.

Thus, rather than a VMM 103 operating at an application level to allocate physical resources 101 that are known and controlled by a host OS 102 in order to create VMs $104_1$-$104_3$ (as in the conventional process of FIGS. 1A-1B), the VM cores 205A-205C of the exemplary embodiment of FIG. 2 enable a plurality of disparate devices that are not known or controlled by a common host OS (and need not even have an OS launched at all) to self-aggregate (or self-assemble) into a pool 207 for enabling/supporting the operations of one or more VMs, such as VM 206.

As part of the VM core's logic (e.g., software code), it is configured to search for a particular community of resources to join. Thus, as each device 201A-201C is powered on, the device's respective VM core 205A-205C looks for and joins an existing physical resource pool (pool 207) that provides the necessary physical resources for supporting operations of VM 206. In this way, the VM cores 205A-205C provide the functionality to self-assemble or self-aggregate into a physical resource pool (such as the pool 207 shown in FIG. 2).

The initial creation of the VM 206 (e.g., upon the first of the devices 201A-201C to start-up) for assigning the virtual resources that are visible to the VM 206 may be managed by the VM core of such device that initially starts up. Further, the VM cores 205A-205C of the devices that provide resources for pool 207 (i.e., that have joined pool 207) manage which of those underlying physical resources of the pool 207 are used in supporting the operations of the VM 206. For instance, as certain resources of the pool 207 fail or are removed from the pool (e.g., as a result of their respective device failing or shutting down), others of the resources in the pool 207 may be used for supporting the VM 206.

The initial creation of the resource pool 207 (e.g., by the first of the devices 201A-201C to start-up) and the management of the allocation of the underlying physical resources in that pool 207 for use in supporting the operations of the VM 206 may be performed in a manner similar to how hot-swappable hardware components are conventionally managed in computing systems. For example, in a server with multiple processors, hot swappable techniques may be employed to enable processors to be added and/or removed without disrupting operations of the server (e.g., without requiring a shutdown and restart of the server). Similarly, hot-swappable techniques can likewise be employed to enable memory to be added and/or removed without disrupting operations of the server (e.g., without requiring a shutdown and restart of the server).

As one example of the initial creation of the resource pool 207 (e.g., by the first of the devices 201A-201C to start-up) in accordance with an embodiment of the present invention, suppose that device 201A is first powered on, while the other peer member devices 201B-201C remain powered off. The BIOS 204A may function in a conventional manner to inventory local physical resources 202A of device 201A, and in some instances the resources 202A may be displayed (e.g., on a display that may be included as part of device 201A). In one embodiment, the BIOS 204A of device 201A may then invoke VM core 205A, which functions to search for and join an existing physical resource pool. For instance, VM core 205A may be configured to search for certain network addresses that are designated as peers. The network addresses may be hard-coded as part of the VM core 205A implementation, or the network addresses may be stored as part of a local or remote database (such as a database maintained on a common VM core data link hub 310 discussed below with FIG. 3) that VM core 205A is programmed to access (e.g., via a LAN, WAN, or other suitable network interface) and then search for its peer member network addresses.

Because device 201A is the first and only one of the devices 201A-201C that is powered on initially (in this example), the VM core 205A does not discover an existing physical resource pool that it is to join. For instance, VM core 205A does not discover any of the peer member devices 201B-201C being online and accessible via their respective network addresses initially. Thus, in one embodiment, the VM core 205A and/or BIOS 204A may effectively pause the process and display to a display of device 201A a message like: "Waiting for other VM core peer members . . . press key when other peer members are powered on." In certain embodiments, the VM core 205A and/or BIOS 204A may be implemented to continue with the process of establishing the resource pool after failing to discover such resource pool pre-existing (e.g., after the expiration of a predefined timer following the display of the above-mentioned message).

Since the VM core 205A of device 201A is, in this example, unable to locate any other peer member devices (or a pre-existing resource pool) to join, device 201A may determine that it is the initial member of the peer group and may therefore take action to create a VM 206. For instance, regardless of what physical resources actually exist in the resource pool 207, the VM core logic 205A of device 201A may create a VM 206 with a specific hardware profile (which may be referred to as the VM's virtual resource profile), such as, 2 CPUs, 1 Gigabyte RAM, 2 network interface cards (NICs), etc. As with the network addresses for its peers, the VM core 205A may be coded with such specific virtual resource profile that it is to create for VM 206, or the specific virtual resource profile for the VM 206 may be stored as part of a local or remote database that VM core 205A is programmed to access (e.g., via a LAN, WAN, or other suitable network interface). In certain embodiments, such defining of a specific virtual resource profile for the VM 206 ensures that the guest OS that may be launched on the VM 206 is not required to be burdened with managing dynamic resources. In effect, the specific virtual resource profile defined for the VM 206 specifies the VM's virtual resources, which are those resources that are visible to the VM's guest OS.

In certain embodiments, the specific virtual resource profile defined for the VM 206 may specify more virtual resources (e.g., a greater number of CPUs, more memory, more network interface cards, etc.) than any one of the peer member devices 201A-201C alone can support (e.g., more than any one of the peer member devices 201A-201C has as its respective physical resources). While VM core 205A is described in this example as creating VM 206, in other embodiments the VM 206 may be created/defined by another device/application (e.g., via a conventional VM creation application), rather than being created by VM core 205A. In either case, the VM cores 205A-205C of the peer member devices 201A-201C operate self-assemble or self-aggregate their physical resources into a resource pool 207 for supporting the operations of such defined VM 206 in accordance with the embodiments described herein.

The actual physical resources contained in physical resource pool 207 support the operations of the VM 206. Initially, the physical resources contained in resource pool 207 are just the physical resources 202A of device 201A, as it is the only device that is initially powered on in this example. Once the other peer member devices 201B and 201C are powered on, their respective VM cores will find the resource pool that they are configured to search for, and they can join such resource pool. For instance, when device 201B is powered on, its BIOS 204B of device 201B invokes VM core 205B, which functions to search for and join an existing physical resource pool. For instance, VM core 205B may be coded to search for certain network addresses that are designated as peers. Again, such network addresses may be hard-coded as part of the VM core 205B implementation, or the network addresses may be stored as part of a local or remote database that VM core 205B is programmed to access (e.g., via a LAN, WAN, or other suitable network interface) and search for its peer member network addresses. As a result of this search, the VM core 205B discovered device 201A as being powered on, and can thus join device 201A as part of physical resource pool 207. As each new peer member device joins the resource pool 207, their physical respective physical resources (e.g., resources 202B and 202C of devices 201B and 201C) are available for use in supporting the operations of the VM 206.

In certain embodiments, once the physical resource pool 207 is created, all of its resources may be displayed (e.g., on a display of one or more of the peer member devices 201A-201C) and/or may be communicated to (e.g., read by) the peer member devices 201A-201C and/or other devices. In certain embodiments, if the initial device 201A does not have sufficient physical resources for supporting the operations of the VM 206, then it may pause its operation (e.g., not initiate the VM 206) until further peer member devices 201B and/or 201C are powered on and join the resource pool 207. For instance, while paused the device VM core 205A of device 201A may cause a display of device 201A to output a message like: "Waiting for other VM core peer members . . . press key when other peer members are powered on." The VM core 205A may then resume its process for self-assembling with one or more other peer member devices 201B-201C to form pool 207 in response to detection of a user depressing a button (or button sequence), e.g., via general purpose input/output (GPIO) or other bus. Alternatively, the VM core 205A may pause and wait for contact/communication from another of its peer member devices 201B-201C, and may then resume its process for self-assembling with one or more other peer member devices 201B-201C to form pool 207 in response to receiving communication from such other peer member device.

As a new peer member device is powered on, such as peer member device 201C, it locates and communicates with one or more of the peer member devices that are part of resource pool 207. Each peer member device may share/communicate an identification of its respective physical resources with the other peer members. Alternatively, each peer member device may simply identify itself to the other peer member devices, and the physical resources of each identified device may be known to or determined by each other peer member device (e.g., through hard-coded information, a database lookup from a local or remote database, such as a database maintained on a common VM core data link hub 310 discussed below with FIG. 3, etc.).

Thus, the peer member devices may keep track of which other peer member devices are present in the resource pool 207 (e.g., via their respective VM cores 205A-205C). That is, through communication between the VM cores 205A-205C of the peer member devices 201A-201C, those peer member devices may each keep track of which other peer member devices have assembled with it to form resource pool 207. Additionally or alternatively, a "master" pool coordinator may be employed to keep track of which peer member devices have aggregated together to form resource pool 207. Such master pool coordinator may be one of the peer member devices (e.g., the initial one of the peer member devices to be powered on, such as device 201A in the above example, may assume this role) in certain embodiments, or it may be another device with which all of the peer member devices are configured to communicate once they are powered on, such as a common VM core data link hub 310 discussed below with FIG. 3. The master pool coordinator and/or the individual peer member devices themselves may monitor the peer member devices to remain informed about the status of those devices and the resources that are available in pool 207. For instance, heartbeat messages and/or other information may be periodically exchanged between the peer member devices after joining the pool 207, whereby each peer member device may inform the other peer member devices of its presence in the resource pool and, in some instances (particularly when one or more of the devices 201A-201C have physical resources that may change from time to time, such as via plug-and-play operations for adding or removing certain resources of the device), to further inform the other peer member devices of the physical resources that it is contributing to the pool 207 at that time.

Figure 3:
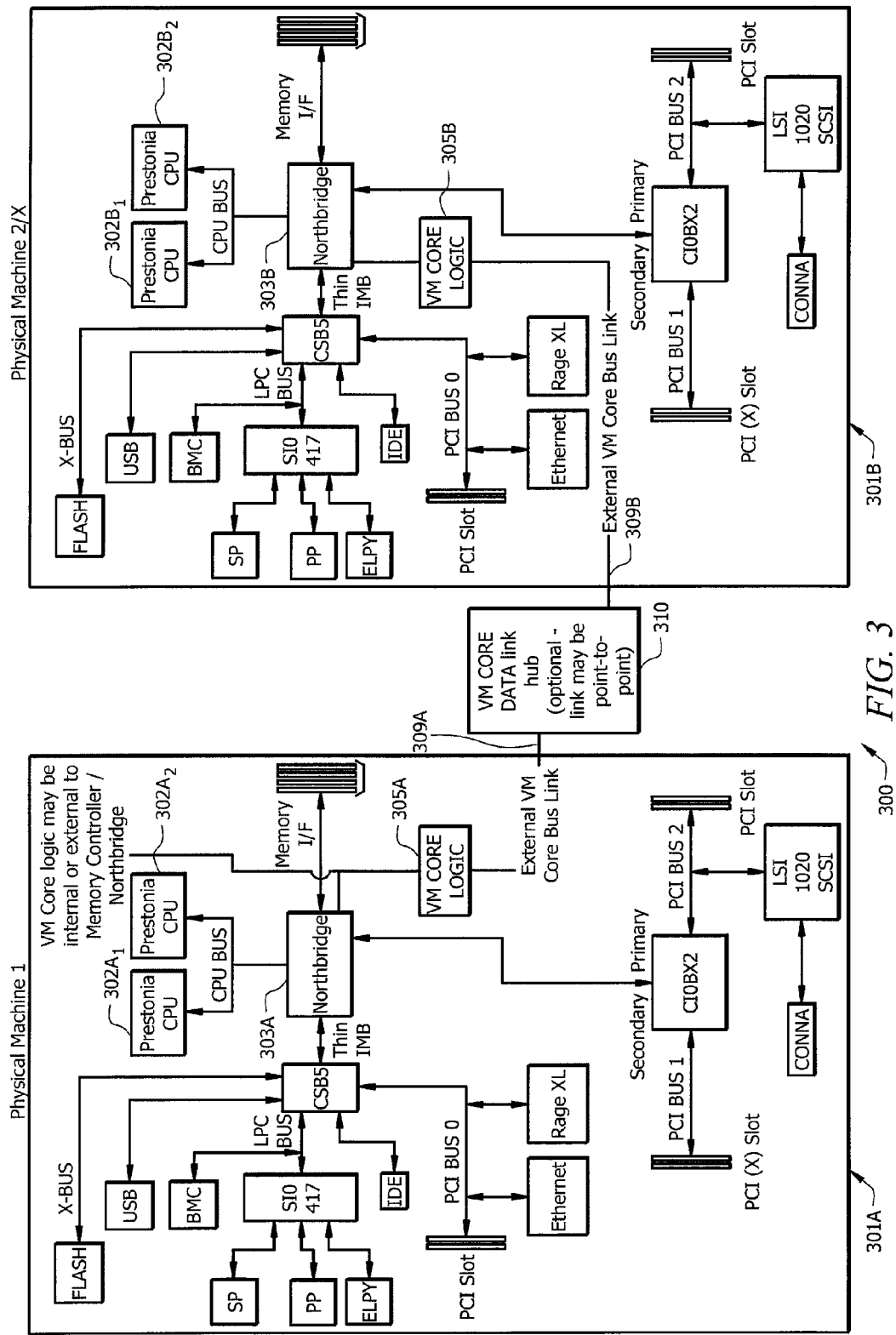
FIG. 3 shows another exemplary system according to an embodiment of the present invention.

FIG. 3 shows one exemplary implementation of a system 300 with devices 301A and 301B shown in greater detail. Of course, embodiments of the present invention are not limited in application or implementation within the exemplary devices shown in FIG. 3, but instead this system 300 of FIG. 3 provides one illustrative example of implementing VM cores (305A and 305B) within concrete, real-world devices 301A and 301B. Again, the concepts described herein (e.g., the VM cores and their functionality) may be implemented in various other ways and/or in various other types of devices, and thus embodiments of the present invention are not restricted or limited to the specific example shown in FIG. 3.

The devices 301A and 301B each include various physical resources. For instance, device 301A includes CPUs $302A_1$ and $302A_2$, and device 301B similarly includes CPUs $302B_1$ and $302B_2$. Various other physical resources are shown as included in each of devices 301A and 301B, including network interfaces (e.g., Ethernet interface), memory, flash data storage, Universal Serial Bus (USB) interface, Integrated Drive Electronics (IDE) interface, and Peripheral Component Interconnect (PCI) interfaces/slots, as examples.

The core chipset of devices 301A and 301B includes a memory controller or "Northbridge" 303A and 303B, respectively. Such a Northbridge has historically been one of the two chips in the core logic chipset on a PC motherboard, the other being the southbridge. Increasingly these functions have migrated to the CPU chip itself. For instance, in Intel "Sandy Bridge" CPU designs introduced in 2011, all of the functions of the northbridge reside on the chip itself. Thus, while a separate northbridge is shown in the devices 301A and 301B, it should be recognized that in some systems/chipsets, the functionality of such northbridge may instead be implemented within the CPU chip itself.

When the separate northbridge is employed in older Intel systems it is named memory controller hub (MCH) or integrated memory controller (IMCH) if equipped with an integrated VGA. The northbridge typically handles communications among the CPU, in some cases RAM, and PCI Express (or AGP) video cards, and the southbridge. Some northbridges also contain integrated video controllers, also known as a Graphics and Memory Controller Hub (GMCH) in Intel systems.

In the example of FIG. 3, VM core logic 305A and 305B are added to the northbridges 303A and 303B, respectively. In each case, the VM core logic may be internal or external to the memory controller/northbridge.

The VM core logic 305A and 305B are configured to communicate with each other (e.g., to self-assemble their respective device's resources into a pool for supporting a VM). As shown in the example of FIG. 3, the VM core logic 305A and 305B may communicate via communication paths (or bus links) 309A and 309B. In certain embodiments, the VM core logic 305A and 305B may each communicatively couple to a common VM core data link hub (e.g., a server) 310 that resides in a communication network. The data link hub 310 may be a server or other device to which the VM core logic 305A and 305B communicatively couple (e.g., via a LAN or WAN interface, or other suitable communicative interface, such as SCSI, iSCSI, Fiber Channel, eSATA, or other computer bus interface), or the data link hub 310 may be a communicative interface, such as a LAN or WAN interface, or other suitable communicative interface, such as SCSI, iSCSI, Fiber Channel, eSATA, or other computer bus interface, that is employed to support communication between the VM core logic 305A and 305B. Although some of the above-mentioned bus interfaces are commonly used for external storage, the interfaces or a variant thereof may be readily adapted for use as (or in connecting to) data link hub 310.

The VM core data link hub 310 may aid in properly routing the communication between the proper VM cores 305A and 305B that are to join a common resource pool. Thus, for instance, the VM cores may each be programmed to communicatively couple to the VM core data link hub 310 and identify themselves to the hub 310, and the VM core data link hub 310 may possess or be capable of accessing information to determine which VM cores are assigned to a common peer group. The VM core data link hub 310 may, for example, determine from a database that VM core logic 305A and VM core logic 305B are each assigned to a common peer group, and thus VM core data link hub 310 may communicatively couple VM core logic 305A and 305B so that they can self-assemble their respective device's resources into a common resource pool in the manner described further herein.

Alternatively, in certain embodiments, the VM core logic 305A and 305B may each communicatively couple to each other directly (via communication paths 309A-309B without the requirement of coupling to a common VM core data link hub 310). Thus, for instance, the VM cores may each be programmed to possess or be capable of accessing information to determine which other VM cores are assigned to a common peer group with it. For example, the VM core logic 305A may determine (e.g., from a database or other information programmed into such VM core) that VM core logic 305B is assigned to a common peer group, and thus VM core logic 305A may communicatively couple (e.g., via point-to-point communication) with VM core logic 305B so that they can self-assemble their respective device's resources into a common resource pool in the manner described further herein.

VM core logic may be implemented in hardware, software, firmware, or a combination thereof on its respective device. In certain embodiments, the VM core logic each comprises a computer-executable software application stored to a computer-readable storage device and executing on a processor (e.g., for performing the operations described further herein as being performed by such logic). The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein (such as the operations of VM core logic described herein) may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC, in certain embodiments.

Thus, in one or more exemplary designs, the functions described may be implemented in hardware, software, firmware, or any combination thereof. If implemented in software, the functions may be stored as one or more instructions or code on a computer-readable medium which are processed/executed by one or more processors.

In accordance with one embodiment, the VM core logic of a pre-defined peer group (e.g., the VM core logic 205A-205C of devices 201A-201C that are pre-defined as members of a common peer group) may operate to create one or more VMs (e.g., VM 206) and self-assemble the physical resources of their respective devices into a resource pool for supporting/enabling the operations of the VM(s). For instance, upon device 201A being powered on, its VM core 205A determines/identifies (either itself or via a VM core data link 310, as discussed above with FIG. 3) its other peer VM cores that are to assemble together to form a common physical resource pool 207 for supporting a VM. VM core logic 205A then attempts to communicatively couple to one or more of the identified peers (either directly via point-to-point communication or via a VM core data link 310, as discussed above with FIG. 3). If VM core logic 205A is not able to successfully couple to any of its identified peers, then it determines that it is the first/only one of the devices in its peer group that is present (e.g., no other peer device is powered on at this time).

In certain embodiments, the VM core logic 205A then creates VM 206 having certain predefined virtual resources, as specified in a virtual resource profile for such VM. In other embodiments, some other logic (other than VM core logic 205A), such as a conventional VMM or other VM creation application (which may be executing on device 201A or on some other device) may create such VM 206 having the specified virtual resources. While one VM 206 is shown in the example of FIG. 2, in certain embodiments, a plurality of VMs may be created and the resource pool 207 may be employed for supporting the operations of all of such plurality of VMs.

As further devices of the pre-defined peer group are powered on, the VM core logic functions to self-assemble the physical resources of their respective devices into a resource pool that contains resources, any of which may be used for supporting/enabling the operations of the VM(s). For instance, continuing with the above example, further suppose that after device 201A is powered on and creates VM 206 in the manner described above, device 201B is powered on. VM core logic 205B of device 201B determines its peer devices and searches for those (e.g., attempts to communicatively couple to them). In doing so, VM core logic 205B identifies device 201A and communicatively couples with VM core logic 205A, in this example. The VM core logic 205A and 205B then self-assemble the further physical resources 202B of device 201B, along with the physical resources 202A of device 201A, into the physical resource pool 207 for supporting/enabling the operations of VM 206. In certain embodiments, the VM core logic 205A and 205B may manage the assignment of resources from pool 207 for supporting operations of the VM 206. In certain embodiments such assignment may dynamically change from time to time, which may be transparent to the VM 206. In other embodiments, conventional resource management techniques, such as conventional VMMs or other resource assignment logic, may be employed for managing the assignment of the resources available in pool 207 for supporting the operations of the VM 206.

Figure 4:
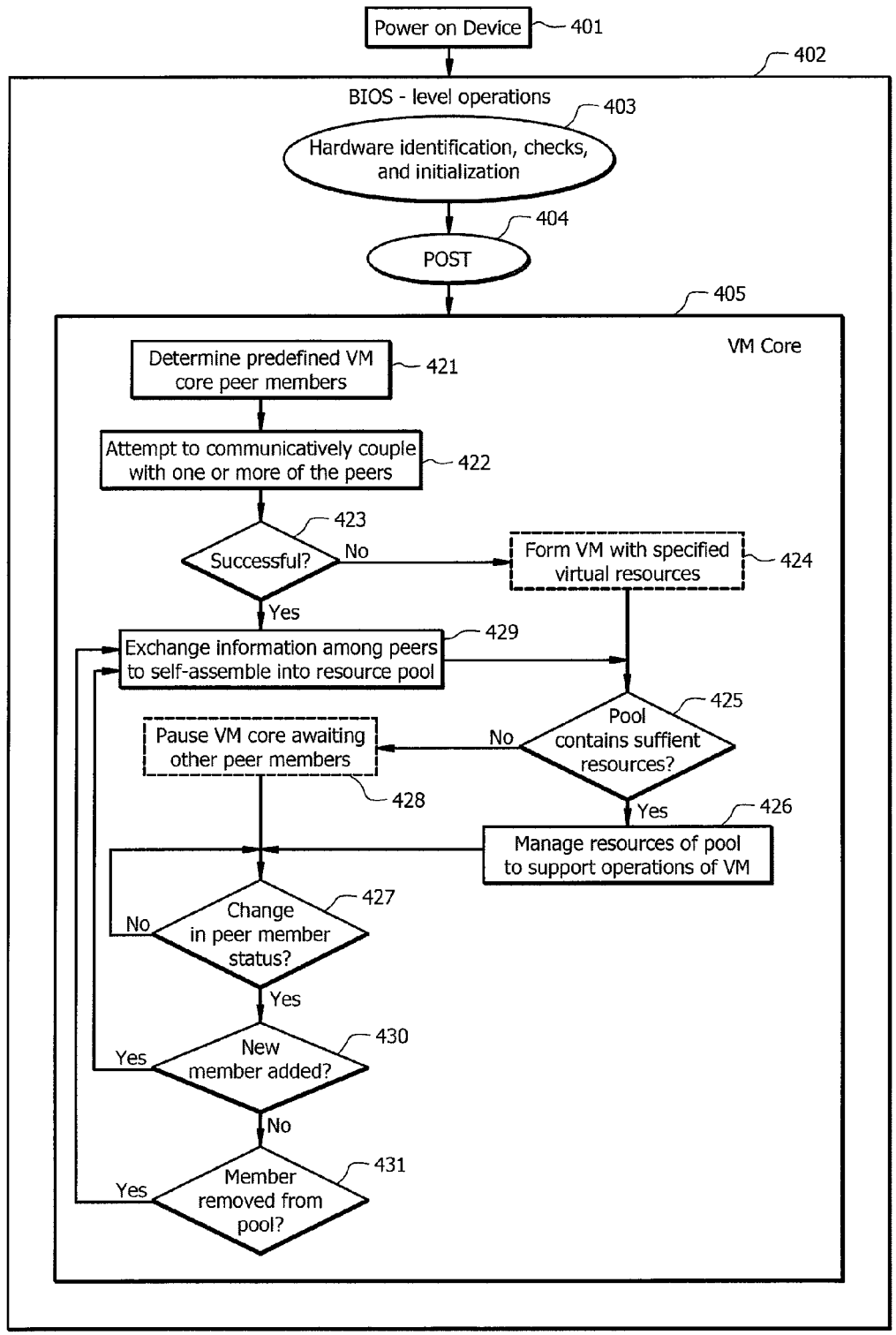
FIG. 4 shows an exemplary operational flow according to one embodiment of the present invention.

An exemplary operational flow of VM core logic according to one embodiment is shown in FIG. 4. In operational block 401, a device (e.g., device 201A of FIG. 2) is powered on. In operational block 402, various BIOS-level operations are performed. For instance, as in conventional computing systems, the device's BIOS may control hardware identification, checks, and initialization in operational block 403, as well as POST operations in block 404.

Further, in operational block 405 the device's VM core logic is launched and performs certain operations for self-assembling the resources of its device with the resources of other designated peer member devices into a pool of resources for hosting VM(s). An example of such operations of the VM core logic in accordance with one embodiment is shown as operations 421-431. In block 421, the VM core determines/identifies its pre-defined VM core peers. In the example of the operation of VM core logic 205A of device 201A in FIG. 2, this may be identifying VM core peers 205B and 205C (or devices 201B and 201C). As discussed further herein, the device (e.g., device 201A) or VM core logic (logic 205A) may be hard-coded with the network address of its pre-defined VM core peers, or it may determine such VM core peers from a local or remote database, such as a database stored to a VM core data link hub 310 (of FIG. 3) which the VM core logic (logic 205A) is configured to communicatively access.

In operational block 422, the VM core logic attempts to communicatively couple with one or more of the peers determined in block 421. If, in block 423, such attempt is not successful (e.g., if the VM core logic is not successful in communicatively coupling with any of its peers), then the VM core logic may determine that it is the only/initial one of the peers that is powered on or otherwise present on the communication network. Thus, in block 424, the VM core logic may create a VM (e.g., VM 206 of FIG. 2) with pre-defined virtual resources (e.g., as may be specified in a virtual resource profile for such VM). In certain embodiments, the VM core logic may not create such VM, but instead, other logic, such as conventional VM creation logic executing on another device, may be responsible for creating the VM. Thus, in certain embodiments, operational block 424 is omitted from the operations of the VM core logic.

In operational block 425, the VM core logic determines whether the pool of resources (e.g., pool 207 of FIG. 2) contains sufficient resources for supporting the operations of the VM(s) that the resource pool is hosting, such as VM 206 of FIG. 2. In this example (where the VM core logic is the only/initial one of the peers that is present on the network), the VM core logic determines that the resource pool contains only the resources of its device (e.g., device 201A) as identified in block 403. The resources contained in the pool may be compared with the resources defined by a virtual resource profile of the VM(s) being hosted on the resource pool to determine whether the pool contains sufficient resources for supporting the VM(s). If determined in block 425 that the resource pool contains sufficient resources to support the operations of the VM(s), then operation advances to block 426 where the resources of the pool (e.g., pool 207) are managed to support the operations of the VM(s). For instance, the resources may be allocated/assigned for supporting the operations of the VM(s). Such management of the resources of the pool of block 426 may be performed by the VM core logic(s) in certain embodiments, or it may be performed by conventional resource management logic (e.g., VMM) in other embodiments. The VM core logic monitors for a change in the VM core peer member status in block 427 to detect, for instance, when a new peer member joins the resource pool or when a peer member departs the resource pool.

If determined in block 425 that the resource pool contains insufficient resources to support the operations of the VM(s), then operation advances to block 428 where the VM core logic's operation may be paused to await the other peer members to join the resource pool. Thus, in block 427, the VM core logic monitors for a change in the VM core peer member status.

If determined in block 423 that the VM core logic's attempt to communicate with one or more of its peer members is successful, then the VM core logic exchanges information with those peer members with whom such communication was successful to self-assemble into a resource pool for hosting VM(s). The exchange of information may include an exchange of information identifying their respective resources that each VM core logic's device is contributing to the resource pool.

In certain embodiments, rather than or in addition to the VM core logic of each peer member device exchanging resource information, a master pool coordinator, such as VM core data link hub 310 of FIG. 3, may receive information from each peer member device identifying the resources that it is contributing to the resource pool. In this way, the master pool coordinator may track the resources that are available in the resource pool (e.g., pool 207) at any given time, and resource management logic may interact with the master pool coordinator for assigning ones of the resources in the pool for supporting operations of the VM(s). From block 429, operation advances to block 425, which determines whether the pool contains sufficient resources, as discussed above.

As mentioned above, block 427 may monitor the peer members for a change in status. Such monitoring may be performed, for example, by periodic exchange of heartbeat messages between peer members that are currently contributing to the resource pool (e.g., to detect when one of those members has departed the pool, such as due to a failure of the member device, etc.). Additionally, the monitoring may include monitoring for communication from a new peer member coming online and joining the resource pool (e.g., as per operational block 422 by that new peer member). The monitoring may be performed by the individual peer member core logic or by a master pool coordinator, such as VM core data link hub 310 of FIG. 3, as examples.

In response to a detected change in VM core peer member status in block 427, operation advances to block 430 where it is determined if the status change is the addition of a new peer member to the resource pool. That is, a new peer member may be detected as coming online and joining the resource pool. If that is the detected status change, then operation advances to block 429 where the newly-added member self-assembles with the other peer members to contribute its resources to the resource pool. In other words, the resource pool is updated to reflect those further resources contributed by the newly-added peer member device.

If the detected change is not the addition of a new peer member device in block 430, then operation advances to block 431 where it is determined that the detected status change is the removal of all or a portion of the resources contributed by an existing peer member from the resource pool. Such removal may be due, for instance, to a failure of all or a portion of such member device. If such removal is the detected status change, then operation again advances to block 429 where the remaining members self-assemble with each other to reflect the loss of the removed resources from the resource pool. In other words, the resource pool is updated to reflect the loss of those resources detected as removed from the pool.

In view of the above, in certain embodiments, a so-called "inverse virtual machine" architecture may be deployed, wherein a plurality of devices, each having a respective VM core logic implemented thereon, self-assembles their respective resources to form a pool of resources on which one or more VMs can be hosted. That is, the assembled pool of resources provides the actual, physical resources for supporting the operations of one or more VMs.

An operating system (or other application-level software) is not required to be employed for managing the pool of resources. Indeed, in certain embodiments, none of the devices that self-assemble into the resource pool are required to even have an OS operating thereon. Thus, while the resource pool formed by the self-assembled devices provides the physical resources for hosting one or more VMs (i.e., effectively forms the "host system"), a host OS that is aware of and that manages the underlying resources is not required. Instead, in certain embodiments, the VM core logic of each device may be implemented independent of a host OS (e.g., may be implemented at the BIOS level of each device), and such VM core logic of each device may interact with each other and/or with a master pool coordinator (such as the VM core data link hub 310 of FIG. 3) to be aware of the resources available in the pool, which may then be managed (e.g., by the VM core logic, the master pool coordinator, and/or other logic, such as a conventional VMM) for supporting the operations of one or more VMs.

Thus, VMs that are created can effectively be hosted on the pool of resources that provides the host system. The pool of resources can provide a high-availability system (e.g., due to fail-over/redundancy provided by the resources in the pool) with improved performance/bandwidth in certain instances. For instance, the underlying resources provided by the member devices that join the resource pool hosting the VM(s) may vary from time-to-time (e.g., due to new devices being powered on and/or due to failure of one or more of the devices), and the pool's resources can be managed to support the VM(s) without being restricted to the fixed resources of a given host system that is managed by a given host OS (as in many conventional VM architectures).

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

The invention claimed is:

1. A method for forming a pool of resources for hosting one or more virtual machines, the method comprising:
launching, on a first device having a first set of resources, a virtual machine (VM) core logic;
determining, by said VM core logic, one or more predefined peer member devices, wherein each peer member device has an independent set of resources; and
communicatively coupling, by said VM core logic, with VM core logics of said one or more predefined peer member devices and exchanging information with said VM core logics of said one or more predefined peer member devices that identifies each device's respective said independent set of resources for self-assembling resources of said first set of resources and resources of said independent sets of resources into a pool of resources for hosting one or more virtual machines according to a predefined virtual resource profile, said profile accessible by each VM core logic,
wherein each VM core logic is implemented in or is launched by a BIOS of each of the devices independent of a VM monitor (VMM).

2. The method of claim 1 wherein the VM core logic is independent of any operating system.

3. The method of claim 1 wherein the VM core logic is launched independent of a VM monitor (VMM) of the first device.

4. The method of claim 3 wherein the VM core logic is launched by said BIOS without said BIOS launching an operating system.

5. The method of claim 1 wherein an OS is not required on any of the devices.

6. The method of claim 1 wherein a host operating system that is aware of the resources in the pool is not required.

7. The method of claim 1 wherein said communicatively coupling comprises:
communicatively coupling with a data link hub, wherein said data link hub identifies said one or more predefined peer member devices and communicatively couples with said one or more predefined peer member devices.

8. The method of claim 1 further comprising:
hosting said one or more virtual machines on said pool of resources.

9. The method of claim 8 further comprising:
managing said pool of resources for supporting operations of said one or more virtual machines.

10. The method of claim 9 wherein said one or more virtual machines each comprises at least one guest operating system and a respective set of virtual resources that are visible to the guest operating system.

11. The method of claim 10 wherein there is no host operating system for managing said pool of resources.

12. A method for forming a pool of resources for hosting one or more virtual machines, the method comprising:
launching, independent of a virtual machine (VM) monitor (VMM), on a first device having a first set of resources, a first VM core logic;
launching, independent of a VMM, on a second device having a second set of resources, a second VM core logic; and
exchanging information between said first VM core logic and said second VM core logic that identifies said first set of resources and said second set of resources for self-assembling the first and second sets of resources into a pool of resources for hosting one or more virtual machines according to a predefined virtual resource profile, said profile accessible by each VM core logic,
wherein each VM core logic is implemented in or is launched by a BIOS of each of the devices.

13. The method of claim 12 wherein the first VM core logic is launched by said BIOS of the first device without said BIOS launching an operating system on the first device.

14. The method of claim 12 wherein an OS is not launched on either of the first and second devices.

15. The method of claim 12 wherein said exchanging information comprises:
said first VM core logic communicatively coupling with a data link hub and communicating said information that identifies said first set of resources; and
said second VM core logic communicatively coupling with said data link hub and communicating said information that identifies said second set of resources.

16. The method of claim 12 further comprising:
hosting said one or more virtual machines on said pool of resources.

17. The method of claim 16 further comprising:
managing said pool of resources for supporting operations of said one or more virtual machines.

18. The method of claim 17 wherein said one or more virtual machines each comprises at least one guest operating system and a respective set of virtual resources that are visible to the operating system; and wherein there is no host operating system for managing said pool of resources.

19. A system comprising:
a first device having a first set of resources, said first device including a first BIOS stored to a first non-volatile memory and a first virtual machine (VM) core logic implemented independent of a VM monitor (VMM), wherein said first set of resources include physical resources;
a second device having a second set of resources, said second device including a second BIOS stored to a second non-volatile memory and a second VM core logic implemented independent of a VMM application, wherein said second set of resources include physical resources; and
wherein said first VM core logic and said second VM core logic are configured to exchange information that identifies said first set of resources and said second set of resources for self-assembling the first and second sets of resources into a pool of resources for hosting one or more virtual machines according to a predefined virtual resource profile, said profile accessible by said first VM core logic, and wherein each VM core logic is implemented in or is launched by the BIOS of each of the devices.

20. The system of claim 19 wherein said first BIOS does not launch an operating system on the first device.

21. A device comprising:
a first set of resources, wherein said first set of resources include physical resources;
a virtual machine (VM) core logic that is configured to determine one or more predefined peer member devices, wherein each peer member device has an independent set of resources, communicatively couple with VM core logics of said one or more predefined peer member devices, and exchange information with said VM core logics of said one or more predefined peer member devices that identifies each device's respective said independent set of resources for self-assembling resources of said first set of resources and resources of said independent sets of resources into a pool of resources for hosting one or more virtual machines according to a predefined virtual resource profile, said profile accessible by said VM core logic; and
a BIOS stored to non-volatile memory,
wherein each VM core logic is implemented in or is launched by a BIOS of each of the devices independent of a VM monitor (VMM).

22. The device of claim 21 wherein an operating system is not launched on said device.

23. The device of claim 21 wherein a host operating system is not required for managing said pool of resources.

24. The method of claim 1 wherein said profile is stored in a member selected from the group consisting of the VM core logic and a remote database.

25. The device of claim 21 wherein said profile is stored in a member selected from the group consisting of the VM core logic and a remote database.

* * * * *